United States Patent
Cantrell et al.

(10) Patent No.: US 10,639,956 B2
(45) Date of Patent: May 5, 2020

(54) TEMPERATURE-CONTROLLED UAV STORAGE SYSTEM

(71) Applicant: Walmart Apollo, LLC, Bentonville, AR (US)

(72) Inventors: Robert Cantrell, Herdon, VA (US); David Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 45 days.

(21) Appl. No.: 15/882,116

(22) Filed: Jan. 29, 2018

(65) Prior Publication Data
US 2018/0236840 A1     Aug. 23, 2018

Related U.S. Application Data

(60) Provisional application No. 62/461,565, filed on Feb. 21, 2017.

(51) Int. Cl.
*B60H 1/00* (2006.01)
*G05D 1/00* (2006.01)
(Continued)

(52) U.S. Cl.
CPC ....... *B60H 1/00014* (2013.01); *B64C 39/024* (2013.01); *B64D 9/00* (2013.01); *B64D 13/08* (2013.01); *G05B 6/02* (2013.01); *G05D 1/0088* (2013.01); *G05D 23/1917* (2013.01); *G05D 23/1927* (2013.01); *B64C 1/00* (2013.01);
(Continued)

(58) Field of Classification Search
None
See application file for complete search history.

(56) References Cited

U.S. PATENT DOCUMENTS 3,778,007 A     12/1973 Kearney, II et al.
5,655,359 A *   8/1997 Campbell ............ B64D 33/02
                                                      244/58
(Continued)

FOREIGN PATENT DOCUMENTS

GB        2530626 A      3/2016

OTHER PUBLICATIONS

HorseFly by Workhorse—Drone Concept Delivery, YouTube, https://www.youtube.com/watch?v=epqZ-luhzKQ, last view Jan. 26, 2018.
(Continued)

*Primary Examiner* — Paul B Yanchus, III
(74) *Attorney, Agent, or Firm* — McCarter & English, LLP; David R. Burns

(57) ABSTRACT

Described in detail herein is an temperature-controlled UAV delivery system. One or more physical objects can be stored inside a temperature-controlled storage unit of a UAV. A temperature controlling device can control the temperature of the interior volume of the temperature-controlled storage unit. Sensors can detect a temperature of the interior volume of the temperature-controlled storage unit. The computing system can control the temperature controlling device to adjust the temperature of the interior volume of the temperature-controlled storage unit to an ideal temperature for storing the one or more physical objects based on the attributes associated with the one or more physical objects.

20 Claims, 8 Drawing Sheets

(51) Int. Cl.
*G05B 6/02* (2006.01)
*B64C 39/02* (2006.01)
*B64D 9/00* (2006.01)
*G05D 23/19* (2006.01)
*B64D 13/08* (2006.01)
*B64C 1/00* (2006.01)
*B64C 1/40* (2006.01)

(52) U.S. Cl.
CPC ........ *B64C 1/40* (2013.01); *B64C 2001/0072* (2013.01); *B64C 2201/128* (2013.01); *B64C 2201/141* (2013.01)

(56) References Cited

U.S. PATENT DOCUMENTS

| | | | |
|---|---|---|---|
| 7,059,566 | B2 | 6/2006 | Byers et al. |
| 8,948,935 | B1 * | 2/2015 | Peeters ................. B64C 39/024 701/3 |
| 9,221,557 | B1 | 12/2015 | Friesel |
| 9,302,783 | B2 | 4/2016 | Wang |
| 9,359,074 | B2 | 6/2016 | Ganesh et al. |
| 9,384,668 | B2 | 7/2016 | Raptopoulos et al. |
| 9,387,928 | B1 | 7/2016 | Gentry et al. |
| 9,412,280 | B1 | 8/2016 | Zwillinger et al. |
| 10,207,804 | B1 * | 2/2019 | Gentry ..................... B64D 9/00 |
| 2005/0000508 | A1 | 1/2005 | Schreft et al. |
| 2007/0171609 | A1 * | 7/2007 | Kehl .................. H05K 7/20181 361/690 |
| 2011/0017863 | A1 | 1/2011 | Goossen et al. |
| 2014/0103158 | A1 | 4/2014 | Berry |
| 2014/0197280 | A1 | 7/2014 | Smith et al. |
| 2015/0006005 | A1 | 1/2015 | Yu et al. |
| 2015/0259078 | A1 | 9/2015 | Filipovic et al. |
| 2015/0276297 | A1 * | 10/2015 | Moore .................. B65D 81/18 62/4 |
| 2015/0302350 | A1 | 10/2015 | Stuckman et al. |
| 2015/0317596 | A1 | 11/2015 | Hejazi |
| 2015/0332206 | A1 | 11/2015 | Trew et al. |
| 2015/0370251 | A1 | 12/2015 | Siegel et al. |
| 2016/0011592 | A1 | 1/2016 | Zhang et al. |
| 2016/0016664 | A1 | 1/2016 | Basuni |
| 2016/0033966 | A1 | 2/2016 | Farris et al. |
| 2016/0200438 | A1 | 7/2016 | Bokeno et al. |
| 2016/0235236 | A1 | 8/2016 | Byers et al. |
| 2016/0244187 | A1 | 8/2016 | Byers et al. |
| 2016/0284221 | A1 * | 9/2016 | Hinkle ................. G08G 5/0034 |
| 2016/0364989 | A1 | 12/2016 | Speasl et al. |
| 2017/0313421 | A1 * | 11/2017 | Gil .......................... H04W 4/70 |
| 2019/0055018 | A1 * | 2/2019 | Bei ....................... B64C 39/024 |

OTHER PUBLICATIONS

Delivery by Drone: The Flying Sidekick Traveling Salesman Problem, YouTube, https://www.youtube.com/watch?v=Vniz2YaklhQ, last viewed Jan. 26, 2018.
Amazon showcases unmanned delivery drones in new video—Times of India, http://timesofindia.indiatimes.com/tech/technews/Amazonshowcasesunmanneddeliverydronesinnewvideo/articleshow/49980358.cms, last viewed Sep. 12, 2016.
The good drones: air delivery of blood samples could save lives, Ultralight delivery drones could save millions CNN.com, http://edition.cnn.com/2016/02/19/health/dronesdeliverhealthcaresamples/, last viewed Sep. 9, 2016.
A miniature drone made of styrofoam helps protects airbases in Afghanistan, Defense Update, http://edition.cnn.com/2016/02/19/health/dronesdeliverhealthcaresamples/, last viewed Sep. 6, 2016.
Atherton, Kelsey, D., Styrofoam Drone, A $38,000 piece of Styrofoam DIY Drones, http://diydrones.com/profiles/blogs/a38000pieceofstyrofoam, last viewed Sep. 9, 2016.
Murdoc, The Amazing, All-Purpose, Styrofoam Drone, The Defense Biz, http://www.defensetech.org/2006/02/09/theamazingallpurposestyrofoamdrone/, Feb. 9, 2006.
Beaubien, Jason, Eyes in the Sky: Styrofoam Drones Keep Watch on Rainforest Trees, NPR News, http://www.wfuv.org/content/eyesskystyrofoamdroneskeepwatchrainforesttrees, May 19, 2105.
The Future of Healthcare is Out for Delivery, Zipline, http://flyzipline.com/product/, last viewed Sep. 9, 2016.
International Search Report and Written Opinion from related International Patent Application No. PCT/US2018/015714 dated Apr. 9, 2018.
International Search Report and Written Opinion from related International Patent Application No. PCT/US2018/015672 dated Apr. 5, 2018.
International Search Report and Written Opinion from related International Patent Application No. PCT/US2018/015683 dated Apr. 24, 2018.

* cited by examiner

TEMPERATURE-CONTROLLED UAV STORAGE SYSTEM

CROSS-REFERENCE TO RELATED PATENT APPLICATIONS

This application claims priority to U.S. Provisional Application No. 62/461,565 filed on Feb. 21, 2017, the content of which is hereby incorporated by reference in its entirety.

BACKGROUND

Unmanned Aerial Vehicles (UAVs) can be used to deliver physical objects. The physical objects may require a temperature-controlled environment.

SUMMARY

In one embodiment, an unmanned aerial vehicle (UAV) temperature-controlled storage system includes an autonomous UAV. The autonomous UAV includes an inertial navigation system, one or more storage units configured to store one or more physical objects, a temperature-controlling device disposed in the one or more storage units and configured to control the temperature within the one or more storage units, and a plurality of sensors disposed in the one or more storage units and configured to detect a temperature of the one or more storage units. The system further includes a computing system equipped with a processor and communicatively coupled to the autonomous UAV. The computing system configured to determine a set of attributes associated with the one or more physical objects and control the temperature-controlling device to adjust the temperature of the one or more storage units based on the set of attributes.

In one embodiment, an unmanned aerial vehicle (UAV) storage method includes storing one or more physical objects in one or more storage units of an autonomous UAV. The autonomous UAV includes an inertial navigation system, a temperature-controlling device disposed in the one or more storage units, and a plurality of sensors disposed in the one or more storage units. The method further includes controlling the temperature within the one or more storage units using the temperature-controlling device, detecting a temperature of the one or more storage units using the plurality of sensors. The method further includes determining, via a computing system communicatively coupled to the autonomous UAV, a set of attributes associated with the one or more physical objects, and controlling, via the computing system, the temperature-controlling device to adjust the temperature of the one or more storage units based on the set of attributes.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein is a temperature-controlled UAV delivery system. One or more physical objects can be stored inside a temperature-controlled storage unit of a UAV. A temperature controlling device and sensors can be disposed within the temperature-controlled storage unit. The temperature controlling device can control the temperature of the interior volume of the temperature-controlled storage unit. Sensors can detect a temperature of the interior volume of the temperature-controlled storage unit. The sensors can transmit the temperature to a computing system that is communicatively coupled to the UAV. The computing system can determine a set of attributes associated with the one or more physical objects stored in the interior volume of the storage unit. The computing system can control the temperature-controlling device to adjust the temperature of the interior volume of the temperature-controlled storage unit to an ideal temperature for storing the one or more physical object based on the attributes associated with the one or more physical objects.

Figure 1A:
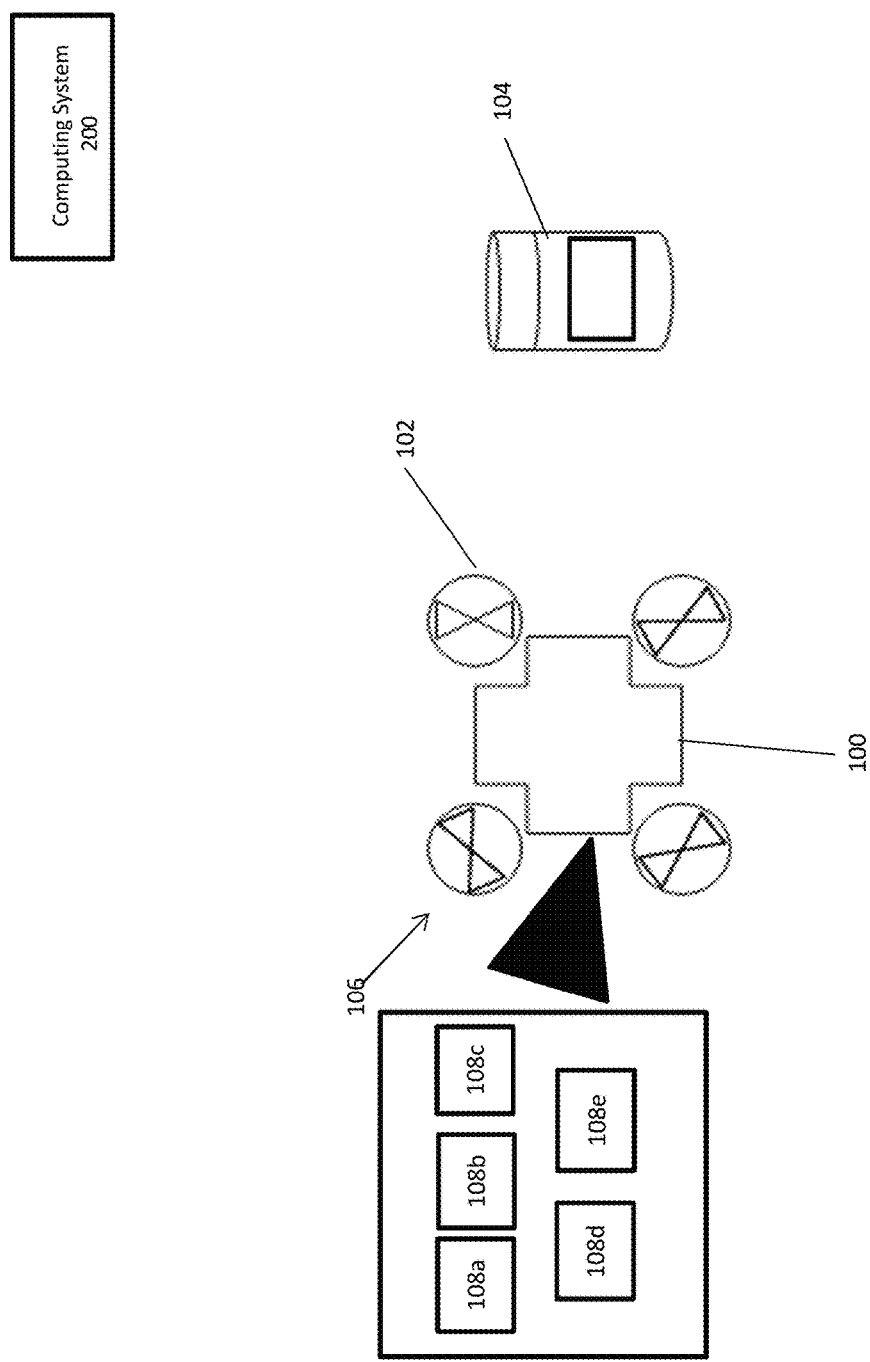
FIG. 1A is a block diagram illustrating an unmanned aerial vehicle (UAV) in accordance with an exemplary embodiment.

FIG. 1A is a block diagram illustrating an unmanned aerial vehicle (UAV) according to an exemplary embodiment. The UAV 106 can include an inertial navigation system and one or more storage units. The autonomous UAV 106 can autonomously navigate aerially using motive assemblies 102. The motive assemblies 102 can be but are not limited to wheels, tracks, rotors, rotors with blades, and propellers. The UAV 106 can include a body 100 and multiple motive assemblies 102. In this non-limiting example, the motive assemblies can be secured to the body on the edges of the UAV 106.

The body 100 of the UAV 106 can include a storage unit. The storage unit can include a delivery mechanism. For example, the delivery mechanism may be, but is not limited to, a picking unit (not shown) such as electrically operated clamps, claw-type clips, hooks, electro-magnets or other types of grasping mechanisms. The UAV 106 can include a controller 108a, and the inertial navigation system can include a GPS receiver 108b, accelerometer 108c and a gyroscope 108d. The UAV 106 can also include a motor 108e. The controller 108a can be programmed to control the operation of the GPS receiver 108b, accelerometer 108c, a gyroscope 108d, motor 108e, and drive assemblies 102 (e.g., via the motor 108e), in response to various inputs including inputs from the GPS receiver 108b, the accelerometer 108c, and the gyroscope 108d. The motor 108e can control the operation of the motive assemblies 102 directly and/or through one or more drive trains (e.g., gear assemblies and/or belts).

The GPS receiver 108b can be a L-band radio processor capable of solving the navigation equations in order to determine a position of the UAV 106, determine a velocity and precise time (PVT) by processing the signal broadcasted by GPS satellites. The accelerometer 180c and gyroscope 108d can determine the direction, orientation, position, acceleration, velocity, tilt, pitch, yaw, and roll of the UAV 106. In exemplary embodiments, the controller can implement one or more algorithms, such as a Kalman filter, for determining a position of the UAV.

The UAV 106 can be configured to pick up physical objects 104 (e.g. a pill bottle) using the picking unit. The size of the physical objects 104 can be proportionate to the size of the UAV 106. The UAV 106 can pick up and carry the physical object 104 to a predetermined location. In some embodiments, multiple UAVs can be configured to pick up a portion of a physical object and carry the physical object together, to a pre-determined location. The UAV 106 can receive instructions from a computing system 200 to deliver one or more physical objects stored in the storage unit to a specified delivery location. The computing system 200 will be discussed in further detail with reference to FIG. 2.

Figure 1B:
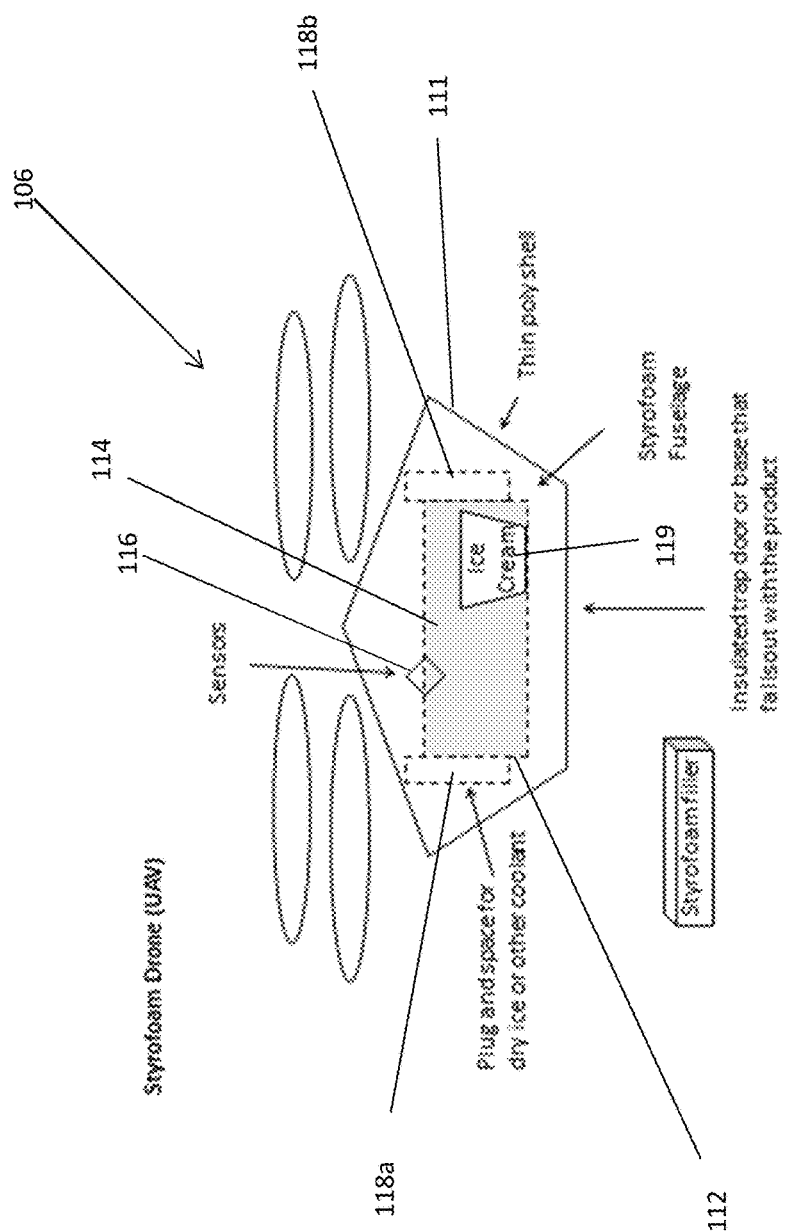
FIG. 1B is a block diagram illustrating a UAV including a temperature-controlled storage unit in accordance with an exemplary embodiment.

FIG. 1B is a block diagram illustrating a UAV 106 that includes a temperature-controlled storage unit in an exemplary embodiment. In one embodiment, the storage unit 112 can include slots 118a-b on either side of the temperature-controlled storage unit. The temperature-controlled storage unit 112 can include a temperature detection sensor 116 and can be configured to store and house one or more physical objects in the interior volume 114. The temperature sensors 116 can be configured to detect the temperature of the interior volume of the storage unit 112. The detected temperature can be encoded into communication signals and transmitted to a computing system with which the UAV 106 is communicatively coupled. A temperature-controlling device 124 located within the UAV 106 is configured to control the temperature of the interior volume 114 and the one or more physical objects being stored in the storage unit. The temperature controlling device 124 can be, but is not limited to, one or more of, on-off controllers, autotune PID controllers, multiloop controllers, safety limit controllers, other types of controllers and temperature switches. As explained further below, the temperature controlling device 124 may be mechanically and/or electrically coupled to, and controls, one or more barriers and/or devices in the UAV by which temperature controlling device 124 is able to control temperature within the interior volume of the UAV. The temperature-controlled storage unit 112 and the UAV 106 can be made of insulated material such as a fuselage made of a closed cell extruded polystyrene foam (an example of which is Styrofoam®) or machinable aerogel. The UAV 106 can also have an aerodynamic body shape which maximizes storage space and insulation capabilities.

Figure 1C:
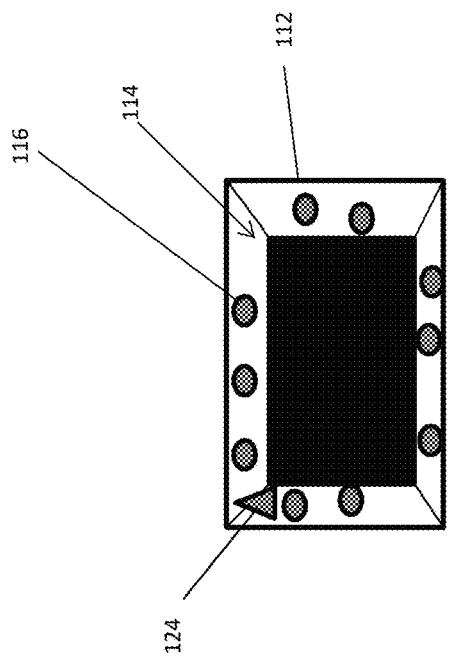
FIG. 1C illustrates an interior view of a temperature-controlled storage unit in accordance with an exemplary embodiment.

FIG. 1C illustrates an interior view of a temperature-controlled storage unit according to an exemplary embodiment. As mentioned above, the storage unit 112 can include an interior volume 114. The interior volume 114 can include multiple sensors 116. In some embodiments, the interior volume 114 can include at least one temperature controlling device 124. Alternatively, the temperature controlling device 124 can be disposed with respect to the temperature-controlled storage unit 112. The sensors 116 can be temperature sensors configured to detect the temperature of the interior volume 114 of the temperature-controlled storage unit 112. In some embodiments, the sensors 116 can be mechanical temperature sensors such as thermometers, or a bimetallic strip. Alternatively, the sensors 116 can be electrical temperature sensors such as thermistor, thermocouple, resistance thermometer or silicon bandgap temperature sensor. In one embodiment, the temperature controlling device 124 can be configured to communicate with a remote computing system and maintain a specified temperature inside the interior volume 114 of the temperature-controlled storage unit 112 based on the detected temperature determined by the sensor and product attributes determined by the remote computing system. The \detected temperature can be encoded into communication signals which are transmitted to the computing system 200. In one embodiment, the temperature sensor may communicate directly with the computing system 200. In another embodiment, the temperature sensor may provide the detected temperature reading to the temperature controlling device 124 which communicates with the computing system.

Upon receipt of the detected temperature, the computing system 200 may look up product attributes and determine that the products being stored in the storage unit 112 are not at a desired temperature. The computing system may instruct the temperature-controlling device to raise or lower the temperature of the interior volume 114 and the stored product 119. For example, in one embodiment, after receiving instruction, the temperature controlling device may send a signal that causes a barrier to alter or break to release coolant. In one embodiment, the temperature controlling device 124 can utilize an active coolant and take actions such as moving a barrier to release more coolant into a position within the UAV that allows more cooling to take place in the storage unit 112. Exemplary active coolants may include, but are not limited to, ammonia, sulfur dioxide, hydrocarbons as well as water and alcohol spritzes. Alternatively, in some embodiments, temperature controlling devices 124 can utilize a passive coolant (e.g., a gel pack, dry ice, ice, combinations thereof, or the like) to adjust temperature within the interior volume. For example, the passive coolant may be stored in slots 118a and 118b in the UAV and the temperature controlling device may send a command to move or alter a barrier between the slots and the interior volume 114 of the storage unit 112 to allow a gel pac, dry ice or similar passive coolant to be exposed and therefore provide more cooling into the storage unit 112. In another embodiment, the temperature-controlling device may initiate an endothermic or exothermic reaction between reactants stored in the storage unit that raises or lowers the temperature in the interior volume 114.

As mentioned above, the temperature controlling device 124 is configured to regulate the temperature within the interior volume 114. In one embodiment, the temperature controlling device 124 can utilize a first reactive material, a second reactive material, a triggering mechanism, and a barrier. The barrier prevents mixing of the first and second reactive materials prior to a triggering event.

In an embodiment, a second barrier (a thermal transfer barrier) may separate the reactive material from the storage area. This thermal transfer barrier may be configurable to allow a measured rate of thermal transfer between the reactive material and the storage area. The thermal transfer barrier may be configured by selecting the size of the contact area (aperture/window). The reactive chamber may be composed of a material that serves to both contain the reactive materials as well as being thermally conductive. For example, the chamber may be composed of aluminum, copper or polymer/plastic. The reactive chamber may be configured to fit/slide into the storage container. In one embodiment, the amount of surface area in contact between the reactive chamber and storage chamber can be configured by changing the position of the reactive chamber. For example a tube within a tube that has a slot may turn the tube with the slot to adjust the surface area to be exposed.

In another embodiment, temperature can be further regulated by implementing more than one reactive chamber. Reactive chambers can be triggered in succession to extend the duration of the reaction or concurrently to provide a greater temperature gradient.

The triggering event may be a signal and/or instruction received from the computing system 200 by the temperature controlling device 124. The triggering event automatically causes the triggering mechanism to alter or move the barrier to initiate at least partial mixing of the first and second reactive materials to produce a resulting reaction (e.g., an endothermic reaction or an exothermic reaction). The resulting reaction regulates the temperature within the interior volume 114 to maintain the temperature within the interior volume 114 at a desired temperature or temperature range. In one embodiment, the triggering mechanism for initiating the force to activate mixing the reactive materials may be a compressed spring. In an embodiment, the spring may be integrated into the removable reactive chamber and may be compressed during preparation/loading of the storage unit.

In an embodiment, the temperature controlling device 124 can utilize an endothermic reaction system configured to produce an endothermic reaction upon mixing of the first and second reactive materials. The endothermic reaction reduces the temperature within the interior volume 114 by absorbing energy. In such embodiments, the first and second reactive materials can be liquids. In one embodiment, the first reactive material can be ammonium nitrate and second reactive material can be water. In one embodiment, the first reactive material for an endothermic reaction system can be selected from sodium chloride, sodium hydroxide, hydrogen chloride, ammonium chloride, potassium chloride, combinations thereof, or the like. In such an embodiment, water can be used as the second reactive material.

In one embodiment, the chamber or chambers in which the reactions take place may be removable, disposable and/or recyclable so as to allow for the removal of spent reactive material. The reactive material may be loaded and/or extracted as a cartridge for easy handling and environmental safety.

In an embodiment, the temperature controlling device 124 can utilize an exothermic reaction system configured to produce an exothermic reaction upon mixing of the first and second reactive materials. The exothermic reaction increases the temperature within the interior volume 114 by emitting energy. In such embodiments, the first and second reactive materials can be liquids. In one embodiment, the first reactive material can be calcium chloride and the second reactive materials can be water. In one embodiment, the first reactive material for an exothermic reaction system can be magnesium sulfate. In such an embodiment, water can be used as the second reactive material. In one embodiment, sodium acetate supercooled to a solid can be used by itself without a second reactive material.

In an embodiment, the temperature controlling device 124 can utilize a mechanical triggering mechanism to adjust the temperature inside the storage unit 112. In one embodiment, the mechanical triggering mechanism can be configured to move or break the barrier in response receiving an instruction from the computing system 200. Movement of the barrier, or breaking of the barrier, allows the first and second reactive materials to mix and generates the resulting reaction. In one embodiment, the first and second reactive materials can be kept together as a solid or liquid and a mechanical force delivered to the reactive materials can set the reaction in motion. For example, the mechanical triggering mechanism can be configured to generate a mechanical force to at least one of the first and second reactive materials in response receiving an instruction from the computing system 200 via the temperature controlling device 124. The mechanical force initiates mixing the first and second reactive materials and generates the resulting reaction.

Triggers for initiating mixing of the first and second reactive materials can be electrical or mechanical. For example, an electric signal can open a gate or initiate a force that can be triggered in response receiving an instruction from the computing system 200 via the temperature controlling device 124. Mechanical triggers can be automatic and based on the different expansion rates of metals due to temperature variations that activate a coil to wind or unwind. Such winding or unwinding of the coil can be a trigger by completing an electrical circuit that opens or breaks a gate or barrier is the conditions within the storage unit reach unacceptable levels.

In one embodiment, the temperature controlling device 124 can utilize a thermoelectric device which creates a voltage when there is a different temperature on each side. An applied temperature gradient causes charge carriers in the interior volume of the storage unit 114 to diffuse from a hot side to a cold side or vice versa. The thermoelectric device can generate the thermoelectric effect, such as a Seebeck effect, a Peltier effect, or Thompson effect.

Figure 1D:
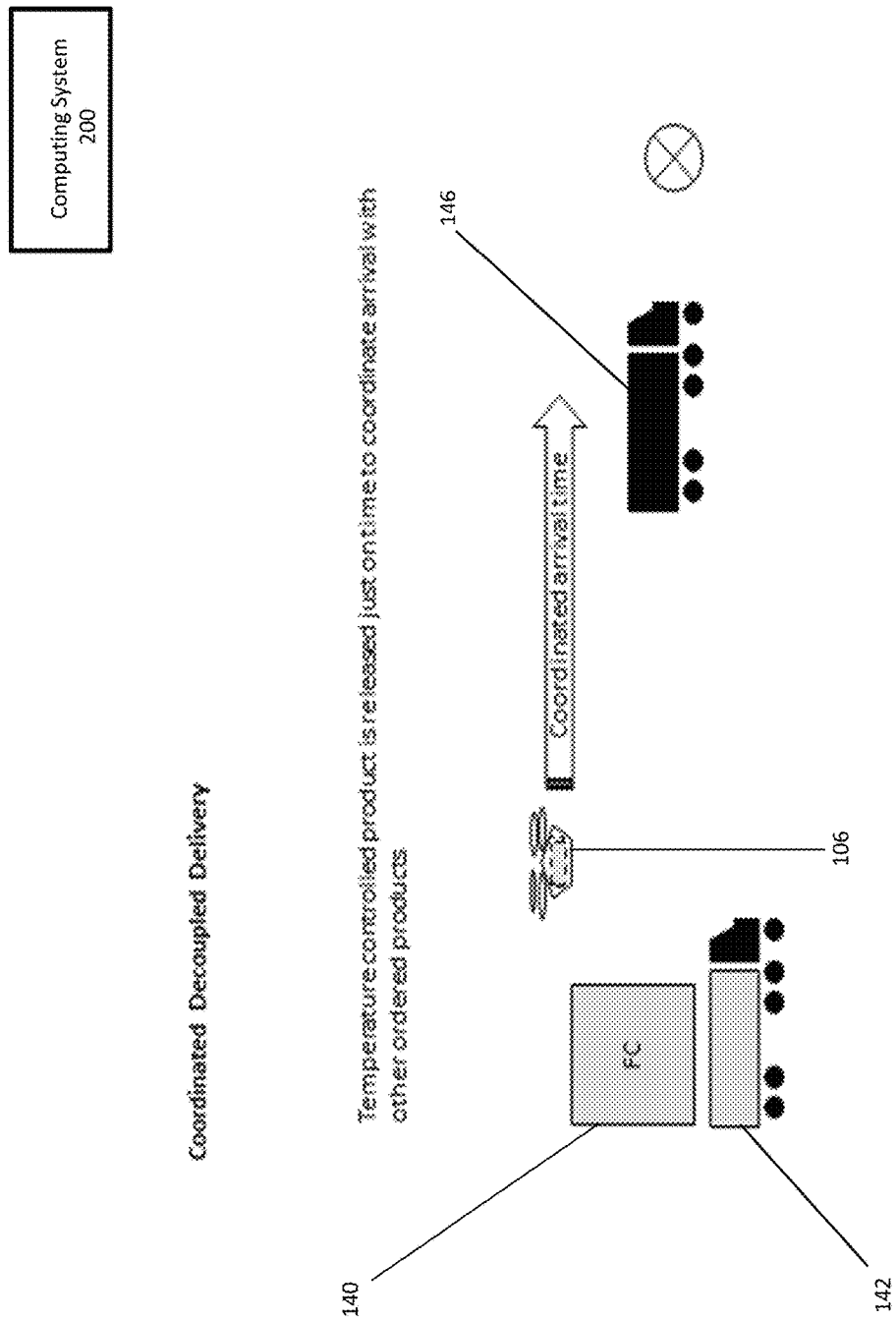
FIG. 1D illustrates a block diagram of a coordinated decoupled delivery in accordance with an exemplary embodiment.

FIG. 1D illustrates a block diagram of a coordinated decoupled delivery according to an exemplary embodiment. A UAV 106 that includes a temperature-controlled storage unit housing and storing a physical object can be transported to within a specified distance of a specified delivery location. A physical object can be loaded into the temperature-controlled storage unit and the UAV 106 can be loaded onto a temperature-controlled delivery vehicle 142. The temperature-controlled delivery vehicle 142 can include a temperature-controlled storage area 140. The temperature-controlled storage area 140 can maintain a specified temperature to assist in maintaining a specified temperature inside the storage unit. For example, the temperature-controlled storage area 140 can be refrigerated and/or heated.

In some embodiments, a user can request multiple physical objects to be delivered at a specified delivery location. At least one of the physical objects can be an object which needs a temperature-controlled environment. The computing system 200 can instruct a UAV 106 to deliver one or more physical objects which need a temperature-controlled environment to a specified delivery location. The at least one physical object can be loaded into the temperature-controlled storage unit on the UAV 106 and the UAV 106 can be loaded into the temperature-controlled storage area 140 of the temperature-controlled delivery vehicle 142. The remaining physical objects can be loaded onto UAVs that do not have a temperature-controlled storage area and the UAVs can be loaded onto a delivery vehicle 146 which does not have a temperature-controlled environment. Alternatively, the remaining physical objects can be loaded onto the delivery vehicle without being loaded onto UAVs. The UAV 106 including a temperature-controlled storage unit can detect that the temperature-controlled delivery vehicle is within a specified distance of the specified delivery location. The UAV 106 can be ordered to be released from the temperature-controlled storage area 140 of the temperature-controlled delivery vehicle 142 by remote computer system 200 so that it can navigate to the delivery vehicle 146 containing the remaining physical objects for delivery. The UAV 106 can land on the roof of the delivery vehicle 146. Alternatively, in another embodiment, the roof of the delivery vehicle 146 can include a perforated screen and the UAV 106 can navigate inside the delivery vehicle through the perforated screen. The computing system 200 can time the release of the UAV 106 with the temperature-controlled product so that the delivery of all physical objects, including those that are not temperature-controlled, occurs at the same time.

Figure 1E:
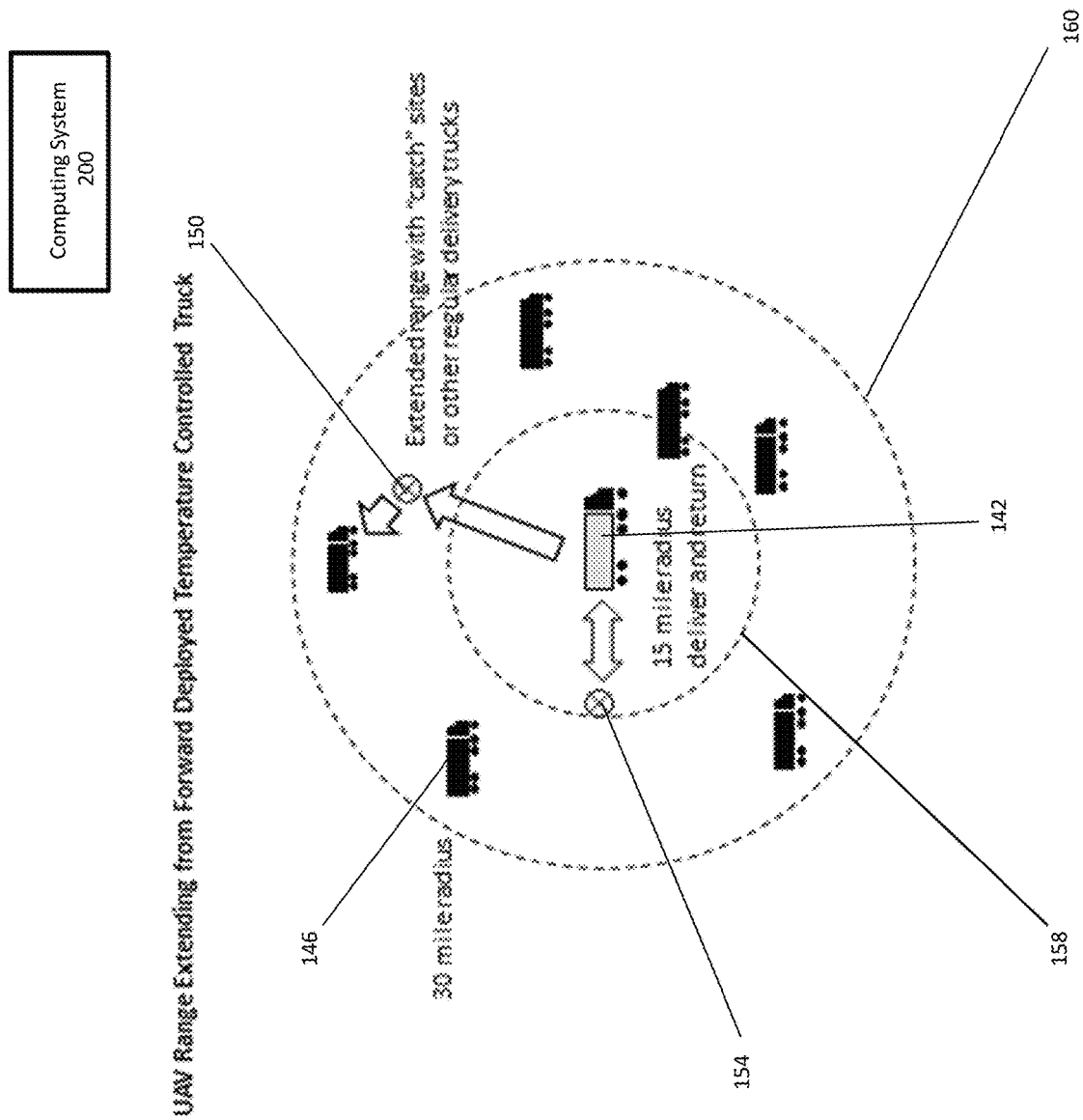
FIG. 1E illustrates a block diagram of a coordinated decoupled delivery with multiple catch sites in accordance with an exemplary embodiment.

FIG. 1E illustrates a block diagram of a coordinated decoupled delivery with multiple catch sites according to an exemplary embodiment that allow the functional travel range of the UAV to be extended. In one embodiment, UAVs 106 including temperature-controlled storage units can be loaded onto a temperature-controlled delivery vehicle 142 including a temperature-controlled environment. Multiple delivery vehicles 146 without a temperature-controlled environment can be within a first specified radius 158 and a second specified radius 160 of the temperature-controlled delivery vehicle 142. In a non-limiting example the first specified radius can be 15 miles and the second specified radius can be 30 miles.

The UAVs 106 be instructed by the computing system 200 to deliver one or more physical objects to a specified delivery location. The UAVs 106 can detect that the temperature-controlled delivery vehicle is within a specified distance of the specified delivery location. The UAVs 106 can then be automatically be deployed from the temperature-controlled delivery vehicle 142 to navigate to one of the multiple delivery vehicles 146 which are not temperature-controlled. The delivery vehicles 146 can be catch sites for the UAVs 106. The UAVs can 106 land on the roof of the delivery vehicles 146. Alternatively, the roof of the delivery vehicles 146 can include a perforated screen and the UAVs 106 can navigate inside the delivery vehicles 146 through the perforated screen. The UAVs 106 can time their release so that the delivery of all physical objects to the same specified delivery location occurs at the same time. The UAVs 106 can also navigate to the appropriate delivery vehicle 146 which is navigating to the specified delivery location.

Figure 2:
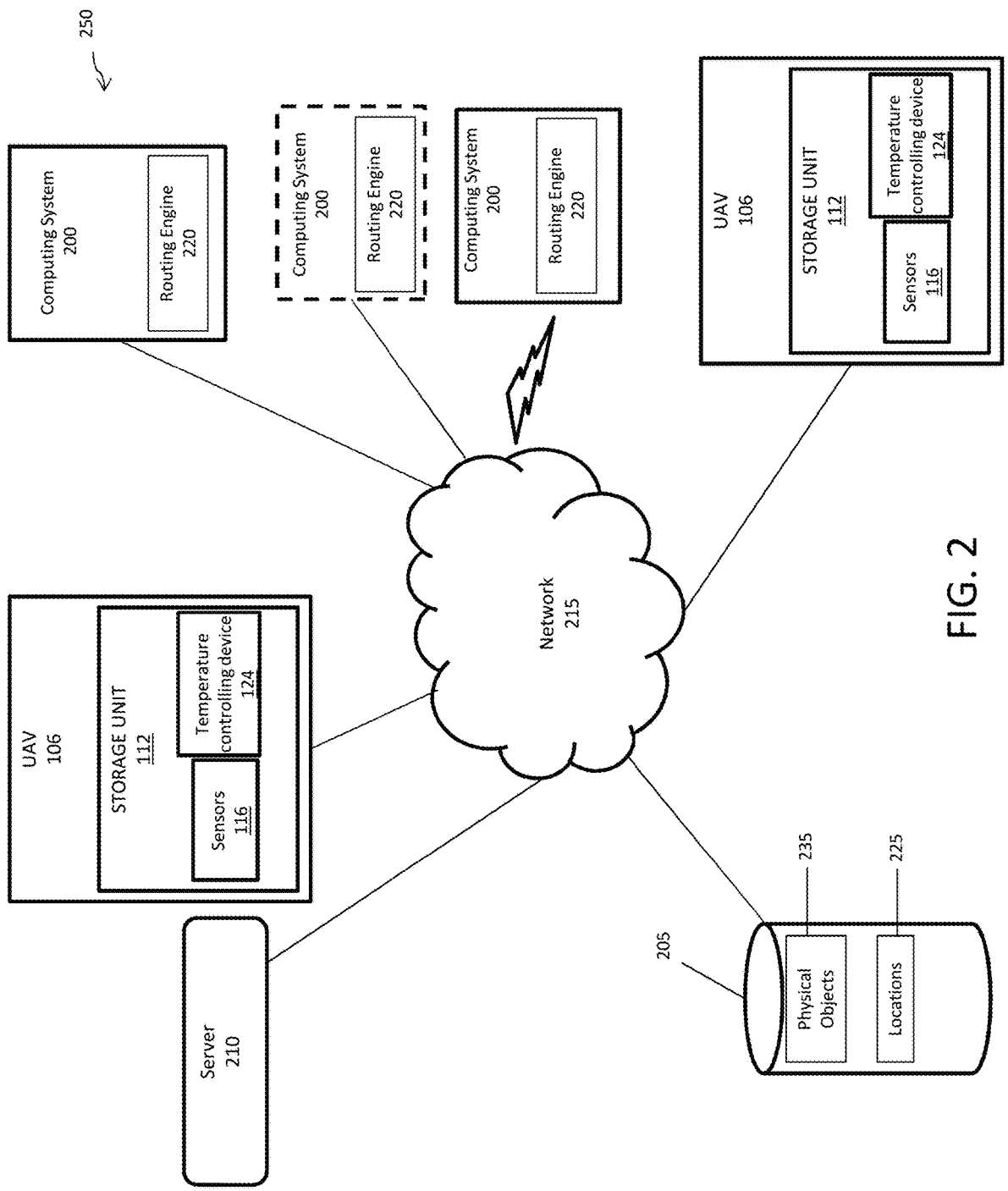
FIG. 2 is a block diagram illustrating a temperature-controlled delivery system in accordance with an exemplary embodiment.

FIG. 2 is a block diagram illustrating a temperature-controlled delivery system according to an exemplary embodiment. The temperature-controlled delivery system 250 can include one or more databases 205, one or more servers 210, one or more computing systems 200, and UAVs 106. The UAVs 106 can include temperature-controlled storage units 112. The temperature-controlled storage units 112 can be configured to store and house one or more physical objects and can include sensors 116 and temperature-controlling devices 124. The sensors 116 can be temperature detection sensors configured to detect the temperatures of the interior volume of the temperature-controlled storage unit 112 and the one or more physical objects stored in the temperature-controlled storage unit 112. The temperature controlling devices 124 can be configured to control the temperature of the interior volume of the temperature-controlled storage unit 112. As noted above, the temperature-controlling devices may be, but are not limited to, one or more of, on-off controllers, autotune PID controllers, multiloop controllers, safety limit controllers, other types of controllers and temperature switches. In exemplary embodiments, the computing system 200 can be in communication with the databases 205, the server(s) 210, and the UAVs 106, via a communications network 215. The computing system 200 can implement at least one instance of a routing engine 220. The routing engine 220 may be an executable application or other executable process executed by the computing system 200. The routing engine 220 can implement the process of the temperature-controlled delivery system 250. The routing engine 220 will be described in detail herein.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 200 includes one or more computers or processors configured to communicate with the databases 205, and UAVs 106 via the network 215. The computing system 200 hosts one or more applications configured to interact with one or more components of the temperature-controlled delivery system 250. The databases 205 may store information/data, as described herein. For example, the databases 205 can include a locations database 225, physical objects database 230. The locations database 225 can include information associated with addresses and/or GPS coordinates of delivery locations. The physical objects database 230 can store information associated for physical object such as optimal temperatures. The databases 205 and server 210 can be located at one or more geographically distributed locations from each other or from the computing system 200. Alternatively, the databases 205 can be included within server 210 or computing system 200.

In exemplary embodiments, the computing system 200 can process instructions to retrieve one or more physical objects from a facility. The computing system 200 can execute the routing engine 220 in response to receiving the instructions. The instructions can include identifiers associated with the physical objects and a delivery location. The routing engine 220 can query the locations database 225 to retrieve the GPS coordinates of the delivery location. The physical objects can be retrieved and can be loaded onto a temperature-controlled storage unit 112 of a UAVs 106. In some embodiments, the routing engine 220 can instruct one or more UAVs 106 to navigate to the locations of the physical objects and to retrieve the physical objects from the facility.

The routing engine 220 can transmit instructions to the UAVs 106 to navigate to a specified location based on the GPS coordinates and to deliver the physical object at the delivery location. The physical object can be at a specified temperature when placed in the temperature-controlled storage unit 112. The sensors 116 can detect the temperature of the interior volume of the temperature-controlled storage unit 112 and the temperature of the physical object. The detected temperature may be encoded into communication signals and communication signals may be transmitted to the computing system 200. The computing system 200 can execute the routing engine 220 in response to receiving the communication signals. The routing engine 220 can decode the temperatures from the communication signals. The routing engine 220 can also determine that the temperature of the interior volume of the temperature-controlled storage unit 112 is greater than or less than a desired temperature of the physical object listed in the database. The routing engine 220 can control the temperature controlling device 124 to adjust the temperature of the interior volume of the temperature-controlled storage unit 112 to the determined ideal temperature and verify the temperature of the physical object.

In some embodiments, the routing engine 220 can receive the identifier of the physical object, prior to depositing the physical object in the temperature-controlled storage unit 112 (i.e. the identifier can be included in the instructions). The sensors 116 can detect a temperature of the interior volume of the temperature-controlled storage unit 112 and a temperature of the physical object, once the physical object is deposited in the temperature-controlled storage unit 112. The sensors 116 can determine when a change in temperature in the interior volume occurs that is greater that is greater than a specified threshold amount (e.g. one or two degrees). Based on exceeding the threshold, the sensors can encode the temperatures of the interior volume and the physical object into communication signals and transmit the communication signals to the computing system 200. The routing engine 220 can decode the temperatures from the communication signals. The routing engine 220 can query the physical objects database 230 using the identifier, to retrieve information associated with the physical object deposited in the temperature-controlled storage unit 112. The information can include, name, type of object, size, weight, dimensions and ideal storage temperatures. The routing engine 220 can determine an ideal temperature at which to store the physical object based on the retrieved set of information. The routing engine 220 can control the temperature controlling device 106 to adjust the temperature of the interior volume of the temperature-controlled storage unit 112 to the determine ideal temperature.

In some embodiments, a routing engine 220 can receive instructions to retrieve and deliver a first and second physical object to a delivery location. The instructions can include a first and second identifier associated with the first and second physical object respectively. The sensors 116 can detect a temperature of the interior volume in response to the first and second physical object being deposited in the temperature-controlled storage unit 112 of the UAV 106. The sensors 116 can determine if the temperature subsequently changes by more than a specified threshold amount. Based on the temperature change exceeding the threshold amount the temperature may be encoded into communication signals (by either the sensors, temperature-controlling device or other device in the storage unit equipped with network communication ability) and transmitted to the computing system 200. The computing system 200 can execute the routing engine 220 in response to receiving the communication signals. The routing engine 220 can decode the temperatures of the interior volume, first physical object and/or the second physical object from the communication signals. The routing engine 220 can query the physical objects database 230 using the first and second identifier to retrieve information associated with the first and second physical object. The information can include, name, type of object, size, weight, dimensions and ideal storage temperatures. The routing engine 220 can calculate an ideal temperature to store both the first and second physical objects based on the retrieved information of the first and second physical objects. The routing engine 220 can control the temperature controlling device 106 to adjust the temperature of the interior volume of the temperature-controlled storage unit 112 to the calculated ideal temperature.

In some embodiments, a routing engine 220 can receive a request for multiple physical objects to be delivered at a specified delivery location. At least one of the physical objects can be an object which needs a temperature-controlled environment. The at least one physical object can be loaded into the temperature-controlled storage unit 112 on the UAV 106 and the UAV 106 can be loaded into the temperature-controlled storage area a temperature-controlled delivery vehicle. The routing engine 106 can instruct the UAV 106 to deliver the physical object to a specified location. The instructions can include an identification of the delivery vehicle which is navigating to the specified delivery location. The remaining physical objects can be loaded onto UAVs that do not have a temperature-controlled environment and the UAVs can be loaded onto a delivery vehicle which does not have a temperature-controlled environment. Alternatively, the remaining physical objects can be loaded onto the delivery vehicle without being loaded onto UAVs. The UAV 106 including a temperature-controlled storage unit 112 can detect that the temperature-controlled delivery vehicle is within a specified distance of the specified delivery location. The UAV 106 can be instructed by the computing system 200 to be released from the temperature-controlled storage area of the temperature-controlled delivery vehicle and can identify and navigate to the delivery vehicle containing the remaining physical objects for delivery. The UAV 106 can land on the roof of the delivery vehicle. Alternatively, the roof of the delivery vehicle can be a perforated screen and the UAV 106 can navigate inside the delivery vehicle through the perforated screen. The computing system 200 can time the release of the UAV 106 so that the delivery of all physical object occurs at the same time.

As a non-limiting example, the temperature-controlled delivery system 250 can be implemented in a retail store. The computing system 200 can receive instructions to retrieve one or more products from a retail store. The computing system 200 can execute the routing engine 220 in response to receiving the instructions. The instructions can include identifiers associated with the products and a delivery location. The routing engine 220 can query the locations database 225 to retrieve the GPS coordinates of the delivery location. The products can be retrieved and can be loaded onto a temperature-controlled storage unit 112 of a UAVs 106. In some embodiments, the routing engine 220 can instruct one or more UAVs 106 to navigate to the locations of the products and to retrieve the products from the retail store.

The routing engine 220 can transmit instructions to the UAVs 106 to navigate to a specified location based on the GPS coordinates to deliver the product at the delivery location. The product can be of a specified temperature when placed in the temperature-controlled storage unit 112. The sensors 116 can detect the temperature of the interior volume of the temperature-controlled storage unit 112 and the temperature of the product. The sensors 116 can detect a change in temperature of the interior volume that is greater than a specified threshold amount. The sensors 116 can encode the temperature into communication signals and transmit the communication signals to the computing system 200. The computing system 200 can execute the routing engine 220 in response to receiving the communication signals. The routing engine 220 can decode the temperatures from the communication signals. The routing engine 220 can determine an ideal temperature for storing the product in the temperature-controlled storage unit 112. The routing engine 220 can control the temperature controlling device 124 to adjust the temperature of the interior volume of the temperature-controlled storage unit 112 to the determined ideal temperature.

In one embodiment, instead of the sensor or the temperature controlling device on the UAV determining that a temperature change of the interior volume exceeds a threshold amount, the temperature may just be periodically detected and transmitted to the remote computing system which analyzes the temperature to make sure it is still within a change threshold. In the event the temperature is determined to have undergone a change exceeding the threshold, the computing system may determine the ideal temperature for stored physical objects and instruct the temperature-controlling device as described herein.

In some embodiments, the routing engine 220 can receive the identifier of the product, prior to depositing the product in the temperature-controlled storage unit 112 (i.e. the identifier can be included in the instructions). The sensors 116 can detect a temperature of the interior volume of the temperature-controlled storage unit 112 and a temperature of the product, once the physical object is deposited in the temperature-controlled storage unit 112. The sensors 116 can determine if the change in temperature is greater than a specified threshold amount. The sensors can encode the detected temperature of the interior volume into communication signals and transmit the communication signals to the computing system 200. The routing engine 220 can decode the temperatures from the communication signals. The routing engine 220 can query the physical objects database 230 using the identifier, to retrieve information associated with the product deposited in the temperature-controlled storage unit 112. The information can include, name, type of object, size, weight, dimensions and ideal storage temperatures. The routing engine 220 can determine an ideal temperature at which to store the product based on the retrieved set of information. The routing engine 220 can control the temperature controlling device 106 to adjust the temperature of the interior volume of the temperature-controlled storage unit 112 to the determine ideal temperature.

In some embodiments, a routing engine 220 can receive instructions to retrieve and deliver a first and second product to a delivery location. The instructions can include a first and second identifier associated with the first and second products respectively. The sensors 116 can detect a temperature of the interior volume, the first product and the second product, in response to the first and second products being deposited in the temperature-controlled storage unit 112 of the UAV 106. The sensors 116 can determine the change in temperatures of the interior volume, first and/or second products is greater than a specified threshold amount. The sensors 116 can encode the temperatures into communication signals and transmit the communication signals to the computing system 200. The computing system 200 can execute the routing engine 220 in response to receiving the communication signals. The routing engine 220 can decode the temperatures of the interior volume, first physical object and/or second physical object from the communication signals. The routing engine 220 can query the physical objects database 230 using the first and second identifier to retrieve information associated with the first and second products. The information can include, name, type of object, size, weight, dimensions and ideal storage temperatures. The routing engine 220 can calculate an ideal temperature to store both the first and second products based on the retrieved information of the first and second products. The routing engine 220 can control the temperature controlling device 106 to adjust the temperature of the interior volume of the temperature-controlled storage unit 112 to the calculated ideal temperature.

In one embodiment, the sensors 116 can detect the outside temperature at a specific altitude, while the UAV is aerially en route to a specified destination. The sensors 116 can encode the outside temperatures into communication signals and transmit the communication signals to the computing system 200. The computing system 200 can execute the routing engine 220 in response to receiving the communication signals. The routing engine 220 can decode the outside temperatures. The routing engine 220 can query the physical objects database 230 using the first and second identifier to retrieve information associated with the first and second products. The routing engine 220 can calculate an ideal temperature to store both the first and second products based on the retrieved information of the first and second products. The routing engine 220 can control the temperature controlling device 106 to adjust the temperature of the interior volume of the temperature-controlled storage unit 112 to the calculated ideal temperature, based on the detected outside temperature.

Figure 3:
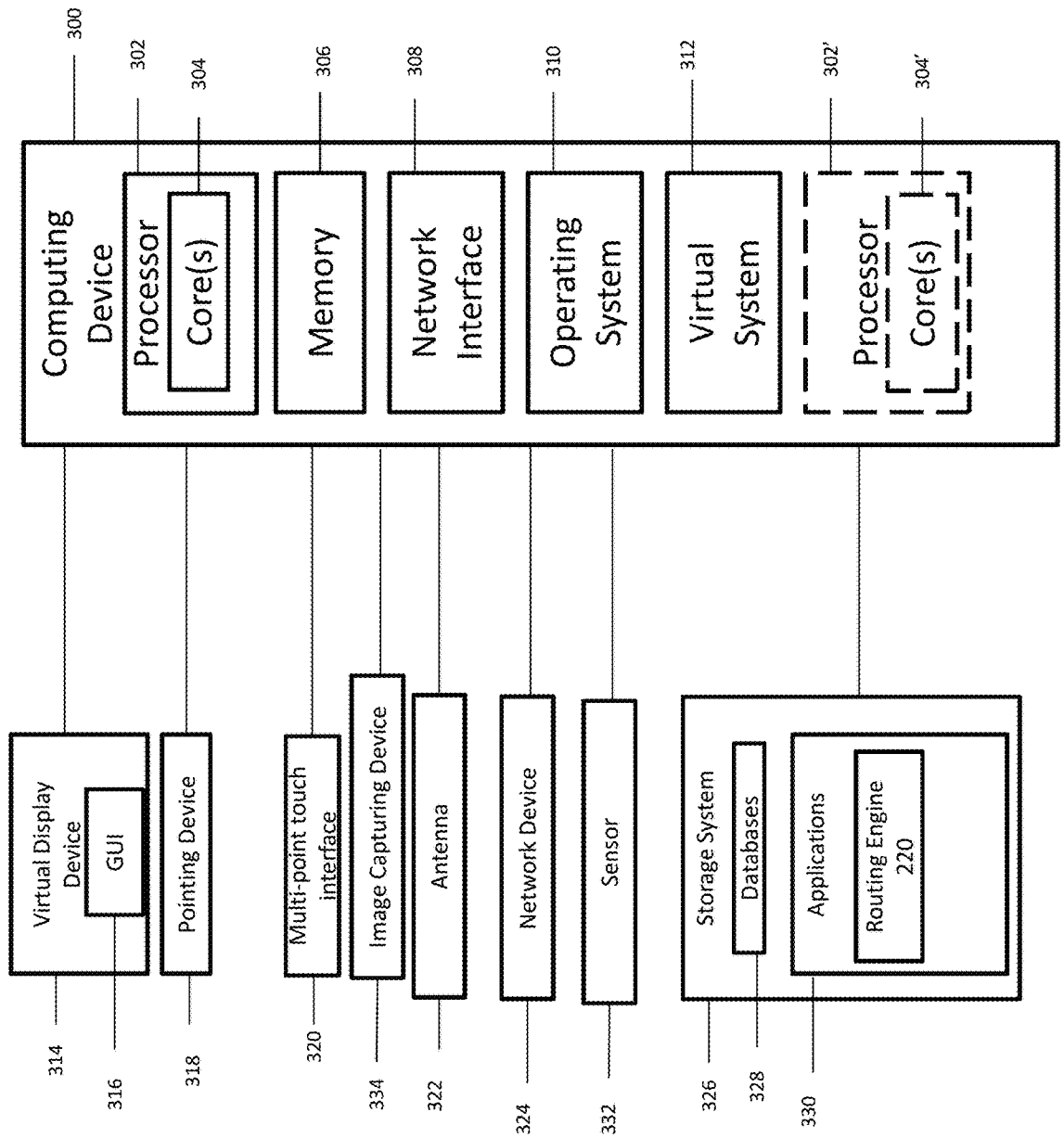
FIG. 3 is a block diagram illustrating of an exemplary computing device in accordance with an exemplary embodiment.

FIG. 3 is a block diagram of an example computing device for implementing exemplary embodiments of the present disclosure. Embodiments of the computing device 300 can implement embodiments of the routing engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the routing engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an image capturing device 334 and an sensor 332. The image capturing device 334 can be configured to capture still or moving images. The sensor 332 can be a temperature sensor, configured to detect temperatures.

The computing device 300 may also include one or more storage devices 326, such as a hard-drive, CD-ROM, or other computer readable media, for storing data and computer-readable instructions and/or software that implement exemplary embodiments of the present disclosure (e.g., applications such as the routing engine 220). For example, exemplary storage device 326 can include one or more databases 328 for storing information associated with delivery locations and information associated with physical objects. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
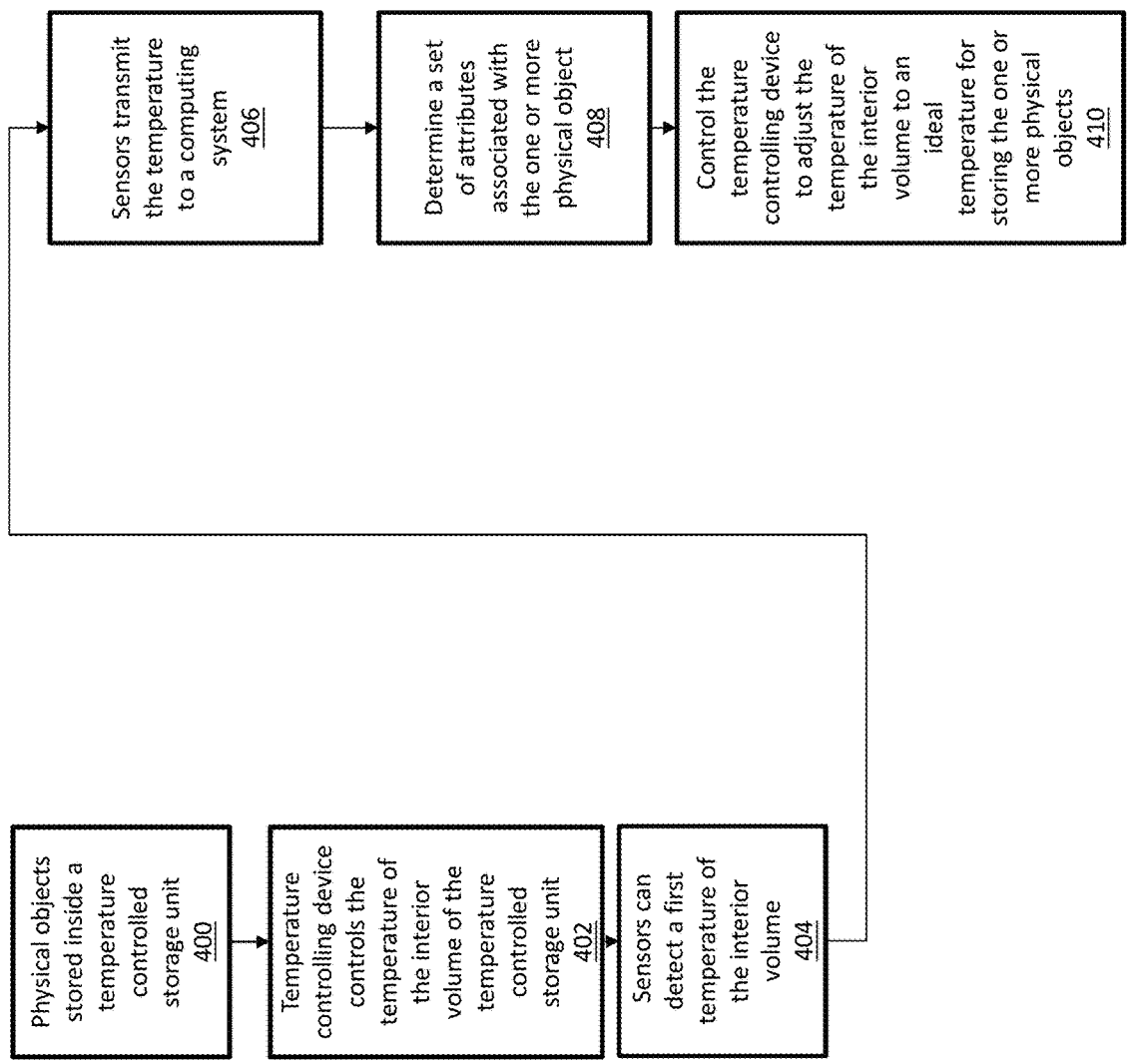
FIG. 4 is a flowchart illustrating an exemplary process carried out using a temperature-controlled delivery system in accordance with an exemplary embodiment.

FIG. 4 is a flowchart illustrating an exemplary process an temperature-controlled delivery system in accordance with an exemplary embodiment. In operation 400, one or more physical objects (e.g. physical object 119 as shown in FIG. 1B) can be stored inside a temperature-controlled storage unit (e.g. temperature controlled storage unit 112 shown in FIGS. 1B, 1C and 2) of a UAV (e.g. UAV 106 as shown in FIGS. 1A, 1B, 1D and 2). A temperature controlling device (e.g. temperature controlling device 124 as shown in FIGS. 1C and 2) and sensors (e.g. sensors 116 as shown in FIGS. 1B-1C and 2) can be disposed within the temperature-controlled storage unit. In operation 402, the temperature controlling device can control the temperature of the interior volume of the temperature-controlled storage unit. In operation 404, sensors can detect a temperature of the interior volume of the temperature-controlled storage unit. In operation 406, the temperature is transmitted from the UAV to a computing system (e.g. computing system 200 as shown in FIG. 2). In operation 408, the computing system can determine a set of attributes associated with the one or more physical objects stored in the interior volume of the storage unit. In operation 410, the computing system can control the temperature controlling device to adjust the temperature of the interior volume of the temperature-controlled storage unit to an ideal temperature for storing the one or more physical object based on the attributes associated with the one or more physical objects.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An unmanned aerial vehicle (UAV) temperature-controlled storage system comprising:
   an autonomous UAV, including:
      an inertial navigation system,
      one or more storage units configured to store one or more physical objects,
      one or more slots adjacent to at least one of the one or more storage units, each slot configured to store a passive coolant and separated from an interior volume of the adjacent storage unit by a barrier,
      a temperature-controlling device disposed in the one or more storage units and configured to control the temperature within the one or more storage units, and
      a plurality of sensors disposed in the one or more storage units and configured to detect a temperature of the one or more storage units; and
   a computing system equipped with a processor and communicatively coupled to the autonomous UAV, the computing system configured to:
      determine a set of attributes associated with the one or more physical objects; and
      control the temperature-controlling device to move the slot barrier to expose the passive coolant to the interior volume to adjust the temperature of the one or more storage units based on the set of attributes.

2. The system of claim 1, wherein the set of attributes is one or more of a type of physical object, a size of physical object and an idle temperature of physical object.

3. The system of claim 1, wherein the temperature-controlling device adjusts the temperature of the one or more storage units using an active coolant.

4. The system of claim 1, further comprising:
a database operatively coupled to the computing system, wherein the computing system is configured to query the database to retrieve the set of attributes.

5. The system of claim 1, wherein the one or more storage units are made of one or more insulated materials.

6. The system of claim 1, wherein the autonomous UAV is further configured to aerially transport the one or more physical objects to a specified location.

7. The system of claim 6, wherein the specified location is a storage area of a first vehicle.

8. The system of claim 7, wherein the autonomous UAV is stored in a storage area of a second vehicle and the computing system is further configured to instruct the autonomous UAV to navigate to the storage area of the first vehicle in response to the second vehicle being within a predetermined distance of the first vehicle.

9. The system of claim 7, wherein the storage area of the second vehicle is temperature-controlled.

10. An unmanned aerial vehicle (UAV) storage method comprising:
storing one or more physical objects in one or more storage units of an autonomous UAV, the autonomous UAV including an inertial navigation system, a temperature-controlling device disposed in the one or more storage units, a plurality of sensors disposed in the one or more storage units, and one or more slots adjacent to at least one of the one or more storage units, each slot configured to store a passive coolant and separated from an interior volume of the adjacent storage unit by a barrier;
detecting a temperature of the one or more storage units using the plurality of sensors; and
determining, via a computing system communicatively coupled to the autonomous UAV, a set of attributes associated with the one or more physical objects; and
controlling, via the computing system, the temperature-controlling device to move the slot barrier to expose the passive coolant to the interior volume to adjust the temperature of the one or more storage units based on the set of attributes.

11. The method of claim 10, wherein the set of attributes is one or more of a type of physical object, a size of physical object, and an idle temperature of a physical object.

12. The method of claim 10, wherein the temperature-controlling device adjusts the temperature of the one or more storage units using an active coolant.

13. The method of claim 10, further comprising:
querying, via computing system, a database operatively coupled to the computing system to retrieve the set of attributes.

14. The method of claim 10, wherein the one or more storage units are made of one or more insulated materials.

15. The method of claim 10, further comprising:
aerially transporting, via the autonomous UAV, the one or more physical objects stored in the one or more storage units, to a specified location.

16. The method of claim 15, wherein the specified location is a storage area of a first vehicle.

17. The method of claim 16, wherein the autonomous UAV is stored in a storage area of a second vehicle and the method further comprises:
instructing, via the computing system, the autonomous UAV to navigate to the storage area of the first vehicle in response to the second vehicle being within a predetermined distance of the first vehicle.

18. The method of claim 16, wherein the storage area of the second vehicle is temperature-controlled.

19. The method of claim 10 wherein the autonomous UAV is a drone made out of an extruded polystyrene foam or machinable aerogel.

20. The method of claim 10 wherein the temperature-controlling device alters or moves a barrier to initiate mixing of a first reactive material with a second reactive material to produce a resulting endothermic or exothermic reaction, the resulting endothermic or exothermic reaction regulating the temperature within the one or more storage units.

* * * * *